June 17, 1958  C. K. HOMEIER  2,839,232
SPARE TIRE AND WHEEL ASSEMBLY CARRIER
Filed June 29, 1956
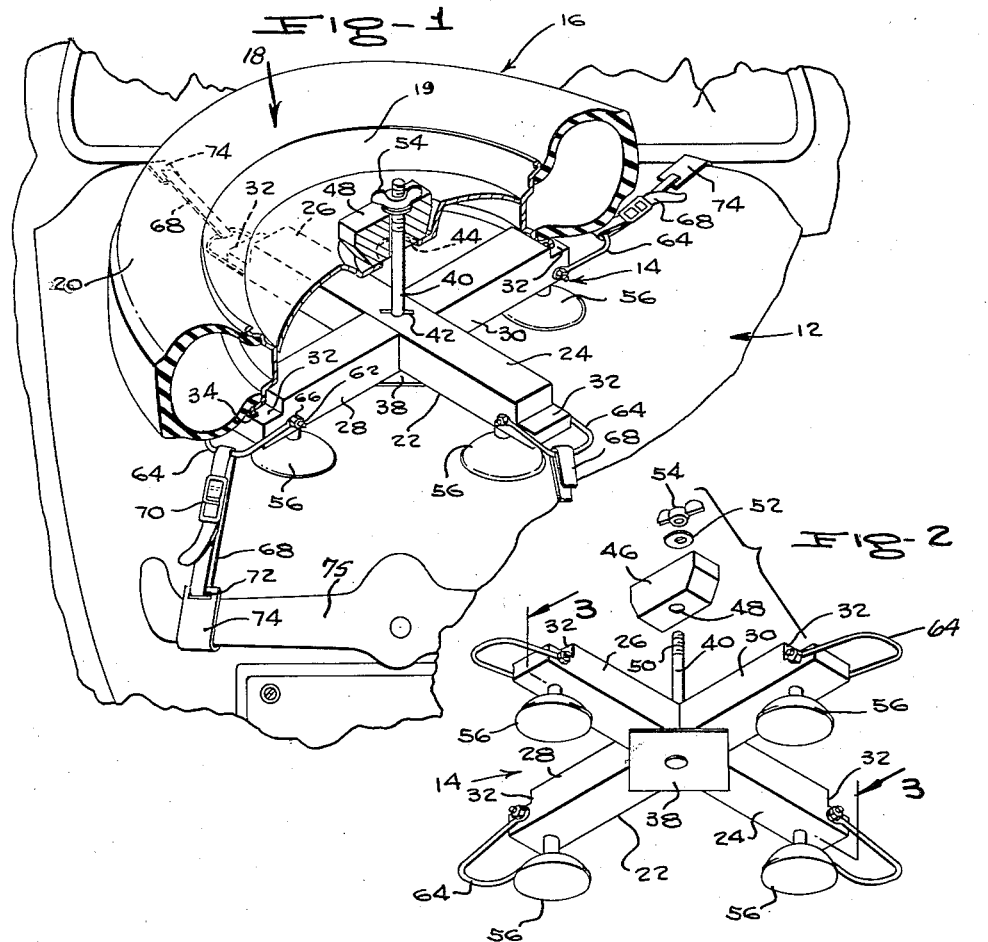
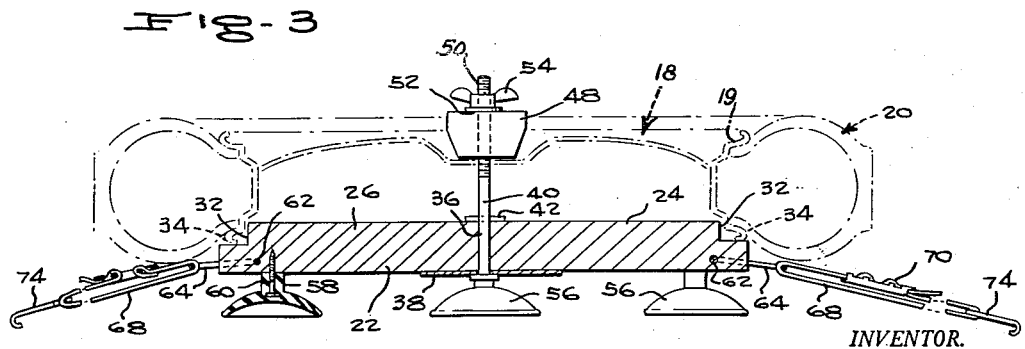
INVENTOR.
CHARLES K. HOMEIER
BY
McMorrow, Berman & Davidson
ATTORNEYS

United States Patent Office 2,839,232
Patented June 17, 1958

2,839,232

SPARE TIRE AND WHEEL ASSEMBLY CARRIER

Charles K. Homeier, Oak Park, Ohio

Application June 29, 1956, Serial No. 594,941

2 Claims. (Cl. 224—42.12)

This invention relates generally to a carrier for a spare tire and wheel assembly designed for mounting upon an upper surface, such as the trunk compartment lid of a vehicle.

Oftentimes when making an especially long trip it is necessary to utilize the full capacity of the trunk compartment of a vehicle unencumbered by a spare tire and wheel assembly.

The primary object of the invention is to provide a practical and efficient carrier of the kind indicated for temporary mounting of a spare wheel and tire assembly on the trunk compartment lid or the roof of a vehicle so as to free the trunk compartment, the carrier being of simple construction and composed of a small number of simple and easily assembled parts.

Another object of the invention is to provide a device of the character indicated, which can be made in attractive, rugged, and serviceable forms at relatively low cost, is easily installed and used, and is highly efficient, satisfactory and acceptable for the purpose intended.

These together with other objects and advantages which will become apparent reside in the details of construction and operation as more fully hereinafter described and claimed, reference being had to the accompanying drawings forming a part hereof, wherein like numerals refer to like parts throughout the several views, and in which:

Figure 1 is a perspective view showing a carrier of the present invention mounted on a vehicle trunk compartment lid and holding a wheel and tire assembly, portions of which are broken away and in section;

Figure 2 is an exploded bottom perspective view of the carrier; and,

Figure 3 is an enlarged vertical transverse sectional view taken substantially on line 3—3 of Figure 2.

Referring to the drawings in detail, there is shown a vehicle trunk compartment lid, indicated generally at 12, upon which is mounted a carrier in accordance with the present invention, and generally designated 14, on which is secured a tire and wheel assembly, indicated generally at 16, including a conventional disc-type wheel 18 on which a tire 20 is retained by flanges 34 on a rim 19.

The carrier 14 includes a cruciform base 22 incorporating right angularly related transverse arms 24 and 26, and 28 and 30. The arms 24 through 30 include in the upper corners of the terminal ends notches 32 for receiving the lower tire retaining flange 34 of the rim 19 of the wheel 18 for centering the wheel 18 on the base 22.

The base 22 may be constructed of any suitable material, such as wood, as shown, or of plastic of the like.

Extending through the center of the base 22 is a vertical bore 36. A plate 38 engaged with the underside of the center of the base 22 has thereon a fixed vertical bolt 40 which rises through the bore 36 and extends above the base 22. The bolt 40 has extending therethrough a pin 42 which overlies the upper surface of the base 22 and prevents downward displacement of the bolt 40 and the plate 38. The bolt 40 extends through the central opening 44 of the wheel 18. A clamping block 46 has a bore 48 removably receiving the bolt 40 and is retained by a wing nut 54 threaded on the upper end 50 of the bolt 40, a washer 52 being circumposed on the bolt 40 between the nut 54 and the clamping block 46. The block 46 engages the center of the wheel 18 so that the tire and wheel assembly 16 is securely clamped on the base 22, and can be easily and readily removed therefrom when desired.

Secured to and depending from the arms 24 through 30 are suction cups 56 which are engageable with the upper surface of the trunk compartment lid 12 for securely mounting the device thereon.

The suction cups 56 may be secured in any suitable manner in the arms of the base 22, as by a shank 58, see Figure 3, traversed by a screw 60 threaded into the underside of the base 22.

Each of the arms 24 through 30 has extending transversely therethrough at the terminal end a bolt 62 whose ends extend beyond opposite sides of the arms and have journaled thereon the apertured ends of a loop 64, which are retained on the bolt 62 by means of retaining nuts 66. The loops 64 have engaged therethrough an end of flexible lashing straps 68 which include buckles for adjusting the lengths thereof. The straps 68 are engaged through slots 72 in one end of J-shaped hooks 74 which are engaged over edges of portions on the lid 12.

As shown in Figure 1, the straps 68 extending from the arms 26 and 30 have their hooks 74 engaged over the upper edge of the trunk compartment lid 12. The straps 68 extending from the arms 24 and 28 may have their hooks 74 engaged over the handle 75 of the lid or engaged over the lower edge of the bumper of the vehicle, or secured in any suitable manner on a convenient portion of the vehicle.

The foregoing is considered as being illustrative only of the principles of the invention. Since numerous modifications and changes will readily occur to those skilled in the art, it is not desired to limit the invention to the exact construction and operation shown and described, and accordingly, all suitable modifications and equivalents may be resorted to, as fall within the scope of the appended claims.

What is claimed is:

1. In combination a spare wheel and tire assembly, said wheel having a rim including a tire retaining flange, a base having a center portion and radial arms having terminal ends having upwardly opening notches therein, said assembly overlying said base with the related tire retaining flange engaged in said notches whereby said assembly is maintained in centered relation to said base, assembly clamping means on said base engaged over said wheel, and mounting means on and depending from said arms, bolts extending crosswise through said arms at their terminal ends, said bolts having ends extending beyond the opposite sides of the arms, U-shaped strap loops having legs terminating in apertured portions journaled in said bolt ends, and loop retaining nuts on said bolt ends.

2. In combination a spare wheel and tire assembly, said wheel having a rim including a tire retaining flange, a base having a center portion and radial arms having terminal ends having upwardly opening notches therein, said assembly overlying said base with the related tire retaining flange engaged in said notches whereby said assembly is maintained in centered relation to said base, assembly clamping means on said base engaged over said wheel, and mounting means on and depending from said arms, bolts extending crosswise through said arms at their terminal ends, said bolts having ends extending beyond the opposite sides of the arms, U-shaped strap loops having legs terminating in apertured portions journaled in said bolt ends, and loop retaining nuts on said bolt ends, adjustable straps having inner ends engaged through said loops and outer ends, and hooks on the outer ends of the straps.

References Cited in the file of this patent

UNITED STATES PATENTS

| | | |
|---|---|---|
| 1,681,864 | Long | Aug. 21, 1928 |
| 2,556,570 | Binsfeld | June 12, 1951 |
| 2,594,319 | Law | Apr. 29, 1952 |
| 2,624,497 | Newman | Jan. 6, 1953 |